Oct. 30, 1945. E. ROBERTS Re. 22,686
BRAKE COOLING FOR CENTRIFUGALS AND THE LIKE
Original Filed Nov. 30, 1934
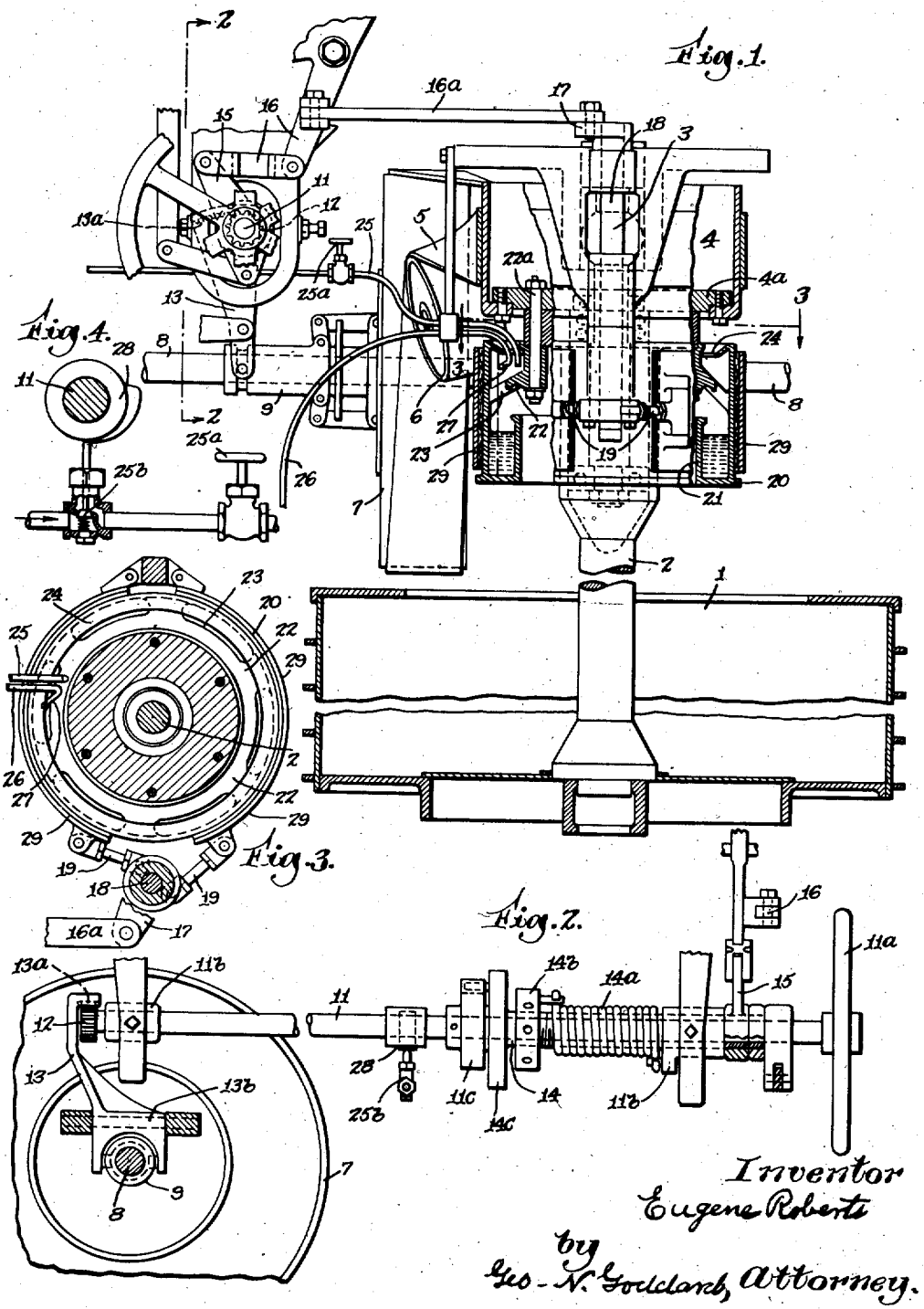
Inventor
Eugene Roberts
by
Geo. N. Goddard, Attorney.

Reissued Oct. 30, 1945

Re. 22,686

UNITED STATES PATENT OFFICE 22,686

BRAKE COOLING FOR CENTRIFUGALS AND THE LIKE

Eugene Roberts, Hastings, N. Y., assignor to The Western States Machine Company, New York, N. Y., a corporation of Utah Original No. 2,096,341, dated October 19, 1937, Serial No. 755,333, November 30, 1934. Application for reissue February 13, 1945, Serial No. 577,613

7 Claims. (Cl. 188—264)

This invention relates to the cooling of brake drums, such as are usually attached to the shaft of a suspended centrifugal or other machine, for the purpose of preventing excessive heating of the brake drum due to the frequent application or setting of the braking elements and is intended to provide an improved liquid cooled brake construction together with an automatic control for the liquid so that during the normal operation of the machine the heat developed by friction may be rapidly conducted away and temperature strains in the brake drum may be graduated, and so that the supply of cooling medium may be controlled so as to avoid splashing or spilling of the liquid.

In certain classes of machines, particularly machines of the type of sugar centrifugals whose cycle of operations, through the development of improvements in recent years, has been cut down to a period of only two or three minutes, the frequent starting and stopping of these heavy machines results in excessive heating of the brake drum to which the friction brake element is applied for the purpose of quickly stopping the machine. No satisfactory solution of this problem has heretofore been found.

The present invention solves this difficulty by providing apparatus to maintain a body of water in the interior of the brake drum while the machine is either rotating or at rest, and to cause a periodic interchange of cool water for heated water in this body through the action of water supply means and water removal means which operate in coordination with each other and with a phase of the successive cycles of operation of the machine.

The body of water maintained in the drum absorbs the heat generated by the brake, drawing it through the wall of the brake drum not only during but after the braking period of each machine cycle. The water body thus keeps the brake from becoming overheated and itself becomes gradually heated, thus tempering the drastic temperature changes such as otherwise would occur frequently in the drum, with a tendency to check or crack it, where the machine runs with great kinetic energy in cycles of brief duration and must be stopped by the brake in each cycle. An unchanged body of water, however, would be boiled away after a few cycles by accumulations of heat from the brake; hence cool water is supplied to the water body in a phase of each cycle, to cool down the water retained, and in addition water is discharged simultaneously from the water body in the drum so as to carry away the accumulated or excess heat absorbed from the previous braking operation, and also so as to prevent the volume of the water body retained from exceeding the amount that will be held by the drum during its rotation. Should the latter occur water would spray or splash around the machine with the result of damaging equipment, wetting operators and falling into the sugar or other material being treated.

This coordinated supplying of cool water and discharging of heated water occur in regular periods or phases of the successive machine cycles lying between the successive braking operations of the machine, and thus they gradually bring the brake drum back to a normal temperature before it is called upon to act again. A system of continuous water supply and continuous water removal, on the other hand, would not be practical for sugar centrifugals of standard type because of the frequent starting and stopping of these machines and the changed speed and other conditions thus entailed, and because of the weakening or complication of the brake or associated structures which such a system would entail.

An illustrative embodiment of this invention will be described in the following specification, while the invention itself will be defined in the claims hereto annexed.

In the drawing I have illustrated one form of construction and arrangement embodying the principles of this invention, in which Fig. 1 is a front elevation showing so much of a centrifugal and its driving, braking and cooling apparatus as is necessary to an understanding of this invention.

Fig. 2 is a side elevation of the control shaft as viewed from sectional plane 2—2 marked on Fig. 1.

Fig. 3 is a sectional plan view on horizontal section plane 3—3 of Fig. 1 to show the construction and arrangement of the revoluble brake drum secured to the vertical shaft of the centrifugal.

Fig. 4 is a detail view showing on an enlarged scale that portion of the cooling liquid supply pipe containing the cut off valve and the regulating valve.

The centrifugal machine to which the brake cooling apparatus is applied in this case for purposes of illustration, comprises the usual centrifugal basket 1 secured to the lower end of a vertical gyratory shaft 2, that is suspended from the hanger 3 by means of the usual and well known ball and socket suspension joint. In this case the centrifugal spindle or shaft carries a belt pulley 4 around which passes a quarter turn driving belt 5, which passes from the clutch driven pulley 1 on the main line drive shaft 8 at the back of the machine and which passes over an intermediate idler pulley 6, all in accordance with well known practice in the case of belt driven machines.

The belt pulley 4, as usual, is secured to apply the belt at the level of the center of gyration of the basket. Below the driving pulley is secured a cylindrical brake drum 20, whose bottom edge is extended by means of an inwardly and upwardly turned flange 21 to form an annular channel or recess for the reception of the cooling liquid. The interior spider or flange 22, which supports the brake drum, is inclined inwardly and upwardly and bolted in this case securely to the bottom spider 4a of the driving pulley 4, as shown at 22a. The outer edge portion of this spider 22 is provided at intervals with arcuate openings 23 located above the liquid receiving recess at 21, so that liquid flowing in to the upper portion of the pulley can escape and run down to the bottom recess or chamber of the pulley without being spilled. The upper edge of the pulley is provided with an annular inturned lip or flange 24, which serves to prevent the escape of the liquid over the top when the machine is in operation. The flange 24, the rim of drum 20 and the inwardly and upwardly extending portions of flange 21 form together an inwardly and upwardly facing annular water-retaining trough or receptacle to retain a body of cooling liquid in the drum while it is either rotating or at rest.

The cooling liquid is supplied by means of a liquid supply pipe 25, which is provided with a regulating valve 25a that can be set by hand to provide any desired rate of flow of the liquid, and beyond the regulating valve 25a is located a self-closing spring actuated valve 25b whose stem extends upward into engagement with an overhead cam, which is secured to the centrifugal horizon control shaft 11.

As the centrifugal control mechanism itself is not the invention herein claimed, only so much of the illustrative construction as may be needed to understand the present improvement will be described. That mechanism is now known in the art and is described in the specification of my copending United States Patent No. 2,145,633, filed June 23, 1934. As shown in Fig. 1, the horizontal control shaft 11 extends alongside of the upper portion of the centrifugal in a fore and aft direction perpendicular to the driving or line shaft 8 at the back of the machine. It carries a hand wheel 11a at the front end and is supported in front and rear stationary aligned bearing members 11b. Intermediate of its ends it carries a loose sleeve 14, around which is coiled a helical spring 14a whose forward end is anchored to the stationary supporting bearing 11b and whose rear end is secured to a circumferentially adjustable tensioning nut 14b mounted on the sleeve. To the sleeve is also rigidly secured a disc 14c having a projecting pin engaged by a shoulder on a cam-like disc 11c, which is pinned to the shaft 11. Secured to the rear end of this shaft is a pinion 12 intermeshing with a toothed arcuate sector member 13a forming part of a clutch shipper fork 13, which is fulcrumed at 13b to shift to and fro a clutch controlling sleeve 9 slidably keyed to the line shaft 8. It will suffice to say that when the control shaft 11 is rotated clockwise it acts, through the shipper fork connection 13, to throw the clutch from the position shown in Fig. 1, and places the centrifugally actuated clutch shoes in active position with respect to the driving pulley 7 on line shaft 8, and the clockwise movement of the shoulder on disc 11c also turns the sleeve 14 to a position where the brake is held inactive against the torsion of spring 14a. This operation occurs, as is well known, in connection with starting the running or sugar treating period of each cycle of operation of the machine. The reverse or counterclockwise rotation of the shaft 11, induced by the helical spring 14a and the pin on disc 14c when the drive and brake control is released from its clutch engaging position, causes the clutch to become inactive and the brake to become set to stop the machine.

The brake setting occurs because at the forward end of the sleeve 14 there is secured thereto a lever 15 having link connections at 16 and 16a with an arm 17 secured to a brake spindle 18, to which are secured toggles 19 in such relation that movement of the brake spindle 18 in one direction as induced by spring 14a contracts the friction shoes 29, forming the braking element, upon the brake drum 20.

About midway of the centrifugal control shaft 11 is secured a cam 28 directly above the cut-off valve 25b, so that, as is best shown in Fig. 4, clockwise rotation of the control shaft, which acts first to release the brake and thereafter to start the centrifugal by throwing in the clutch, serves also when the centrifugal is started on fast rotation to depress the valve 25b to open position and allow the cool liquid to flow through supply pipe 25 to the interior of the pulley. The fast rotation of the centrifugal causes the liquid in the pulley or drum to build up in a ring-like wall against the inside of the brake drum 20, as indicated by vertical dotted line in Fig. 1.

At a convenient distance inward from the inside face of the brake drum 20 and spaced above the bottom wall thereof is located the end of a discharge or draw-off pipe 27, which is turned to face the direction of revolution of the brake drum and acts as a scoop to carry off the excess of water beyond a predetermined vertical line, so that not only is the liquid prevented from overflowing or escaping from the pulley otherwise than through the pipe, but since the water heated by contact with the drum becomes less dense than the cooler entering water and therefore moves to the inside, this off-take pipe 26 serves to remove the heated water and retain a supply of cool water constantly against the inner face of the brake drum. Accordingly, the heat is continuously abstracted from the water body in the brake drum while the machine is in operation, and when the machine stops the liquid then collects and is retained in the receptacle of the drum, where it continues to draw heat from the drum, while at the same time through the counterclockwise rotation of the cut-off device 28 the supply of water is cut off due to the fact that the same rotative movement of the sleeve 14 and control shaft 11 that releases the clutch and sets the brake acts through device 28 to allow the spring applied to the valve 25b to close the valve. The hand valve 25a permits complete regulation of the supply of cooling liquid.

The above arrangement not only provides a very effective and simple means for rapidly conducting away the heat developed by the friction of the brake element on the brake drum, but it provides a fool-proof arrangement preventing the spilling of the liquid away from the machine or into the basket by reason of the fact that when the machine is running the off-take pipe 26 will limit the accumulation of liquid to a predetermined point, while on the other hand the very act of throwing out the clutch and setting the brake necessarily results in cutting off any further supply of liquid. The body of liquid retained inside the brake drum or rim after the supply has been cut off prevents overheating of the drum by drawing heat from its inner face as long as a temperature difference exists. The flow of cool liquid into this body and in intimate contact with the inner face of the drum or rim during a subsequent running of the machine, together with the concurrent removal of heated liquid from the body through the off-take 26, completely cools the body of the liquid and the rim to a normal operating temperature before the next brake operation occurs and generates more heat.

The body of water constantly maintained inside the brake drum prevents overheating of the drum, the brake linings and the bearings of the centrifugal spindle, and reduces destructive thermal shocks in the drum that otherwise result from the frequent stopping of high speed or heavy-duty centrifugal machines. If the cool water supply inadvertently should not function this water body also serves as a safety factor, enabling the brake to be operated several times before overheating can occur, and warning the machine attendant, by the emission of steam, that the system requires attention. The systems herein disclosed have the further practical advantage of avoiding the spilling or splashing of water into the centrifugal basket or elsewhere away from the brake drum of the machine.

It will be understood of course, that the invention is not restricted to use on a vertical shaft nor to these special features of construction and operation that are of particular utility in the centrifugal field, the true measure of the invention being the spirit of the disclosure and the requirements of the claims but not the illustrative details mentioned hereinabove.

What I claim is:

1. A centrifugal machine having a central basket shaft provided with a driving pulley and a brake drum having an annular trough for cooling liquid adjacent the inner periphery thereof, means including a control shaft by which the energizing of the driving pulley and the energizing of the brake is alternatively effected, and means for supplying cooling liquid into said trough, said liquid supplying means being responsive to movement of said control shaft to supply liquid while the driving means is active and to cut off the liquid supply when the brake is active.

2. A liquid cooled brake including a brake rim and means forming with said rim an inwardly facing annular trough for retaining a body of liquid inside the rim while the same is rotated, means for supplying cooling liquid into said trough, means for drawing off excess liquid during rotation of the rim to maintain a predetermined volume of liquid therein, and means for interrupting the operation of said liquid supplying means before the rim is brought to rest.

3. A liquid cooled brake drum adapted for attachment to a vertical shaft, said drum being provided with means at top and bottom defining an inwardly facing annular trough for retaining a body of liquid inside the drum while the drum is either rotating or at rest, means for drawing off excess liquid to maintain a predetermined volume of cooling liquid inside the brake drum while the shaft is rotating, and means for cutting off a fresh supply of liquid to the drum when the brake is applied.

4. A water cooled brake system for a cyclically operated centrifugal machine comprising a brake drum attached to the vertical shaft of the machine and constructed as an annular receptacle to hold a body of water effective for cooling the drum while it is either rotating or at rest, said drum including a rotatable brake flange and a cylindrical brake rim thereon formed at the top with an inwardly directed flange and at the bottom with an inwardly directed imperforate bottom wall having an upwardly directed extension in spaced relation to said rim defining therewith and with said bottom wall an inwardly and upwardly facing annular water-retaining trough for so holding said body of water, water supply means including a conduit extending into said trough and periodically operative inflow control means for periodically supplying cool water through said conduit to the body of water inside said drum in each of the successive machine cycles, and means operative concurrently with said water supplying means for removing heated water from said body, said removal means comprising an offtake conduit extending into said trough to a predetermined position spaced from said rim and said bottom wall to take off water from said drum as the body of water therein exceeds a predetermined volume effective for cooling and within the water-holding capacity of said drum.

5. A water cooled brake system for a suspended cyclical centrifugal machine comprising a brake drum attached to the vertical shaft of the machine and constructed as an annular receptacle to hold a body of water effective for cooling the drum while it is either rotating or at rest, said drum including a rotatable brake flange and a cylindrical brake rim thereon formed at the top with an inwardly directed flange and at the bottom with an inwardly directed imperforate bottom wall having an upwardly directed extension in spaced relation to said rim defining therewith an inwardly and upwardly facing annular trough for retaining the body of water against the inside of the rim while the drum is either rotating or at rest, water-supply means including an inflow conduit extending into said trough and inflow control means connected with said conduit operative periodically intermediate the successive braking operations of the machine to supply cool water through said conduit into the drum to cool the body of water therein, and means operative intermediate the successive braking operations of the machine and concurrently with the operation of said supply means to remove heated water from the drum, said removal means comprising an offtake conduit extending into said trough to a position so predetermined so as to remove from said trough only such water as exceeds a predetermined volume adequate for cooling and within the water-holding capacity of the drum.

6. A water cooled brake system for a suspended cyclical centrifugal machine comprising a brake drum attached to the vertical shaft of the machine formed with an inwardly facing annular trough to hold a vertical annular wall of water during each running period of the machine and with a merging upwardly facing annular channel to hold a body of the water while the machine is at rest, means rendered operative in coordination with the starting of each running period and rendered inoperative in coordination with each braking period of the machine to supply cool water into the drum so as to cool the body of water therein, and means operative during each running period to remove heated water and prevent spilling of excess water from the rotating drum and to limit the body of water retained therein to a volume within the static water-holding capacity of said channel.

7. A cyclically operated centrifugal machine comprising the combination of a suspended basket shaft provided with a driving means and a brake having a brake drum on said shaft formed as a receptacle to retain a body of water in the drum effective for cooling the same while the drum is either rotating or at rest, said drum including a rotatable brake flange and a cylindrical brake rim thereon formed at the top with an inwardly directed annular flange and at the bottom with an inwardly directed imperforate bottom wall having an upwardly directed annular extension in spaced relation to said rim to define therewith an inwardly and upwardly facing annular trough to retain a body of water as aforesaid, centrifugal control means interconnected with said driving means and said brake and including a shiftable member movable to different positions at which, respectively, the machine is driven and the machine is stopped, means for supplying cooling water into said trough including an inflow conduit extending thereinto and a control valve for said conduit, means movable with said shiftable member and operative at one of said positions thereof to hold said valve open to supply water through said conduit, means operative when said member is moved away from said one position to close said valve to interrupt the water supply, and water removal means operative during the period of said water supply for taking off heated water from the body of water in said trough as the volume of said body exceeds a predetermined maximum, said removal means including an off-take conduit extending into said trough to a predetermined location spaced inwardly from said rim and above said bottom wall.

EUGENE ROBERTS.